Dec. 29, 1964     J. C. RAY     3,163,236
SOIL SPIKING MACHINE
Filed Oct. 30, 1962
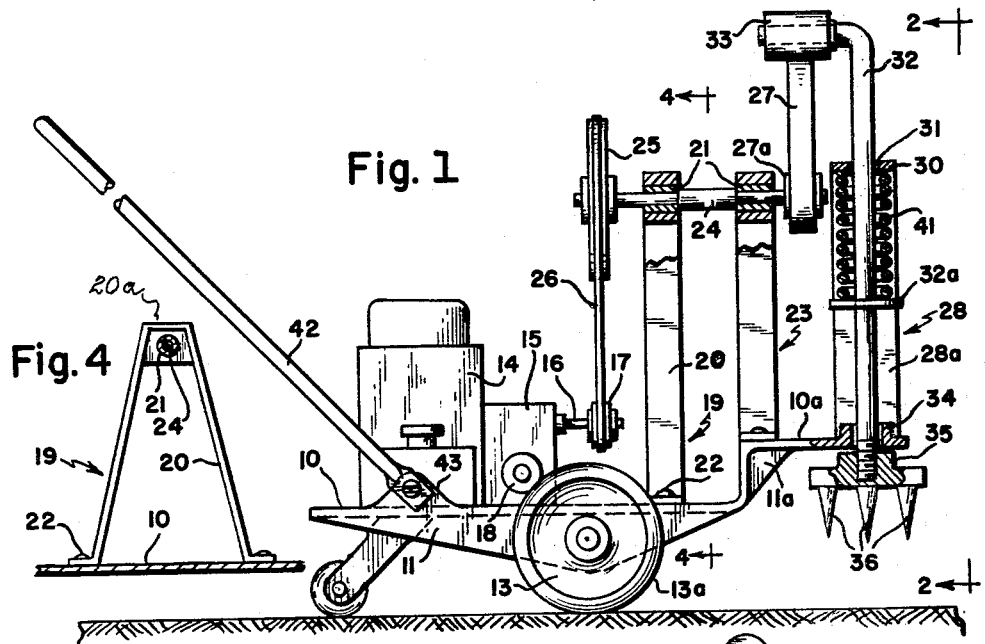
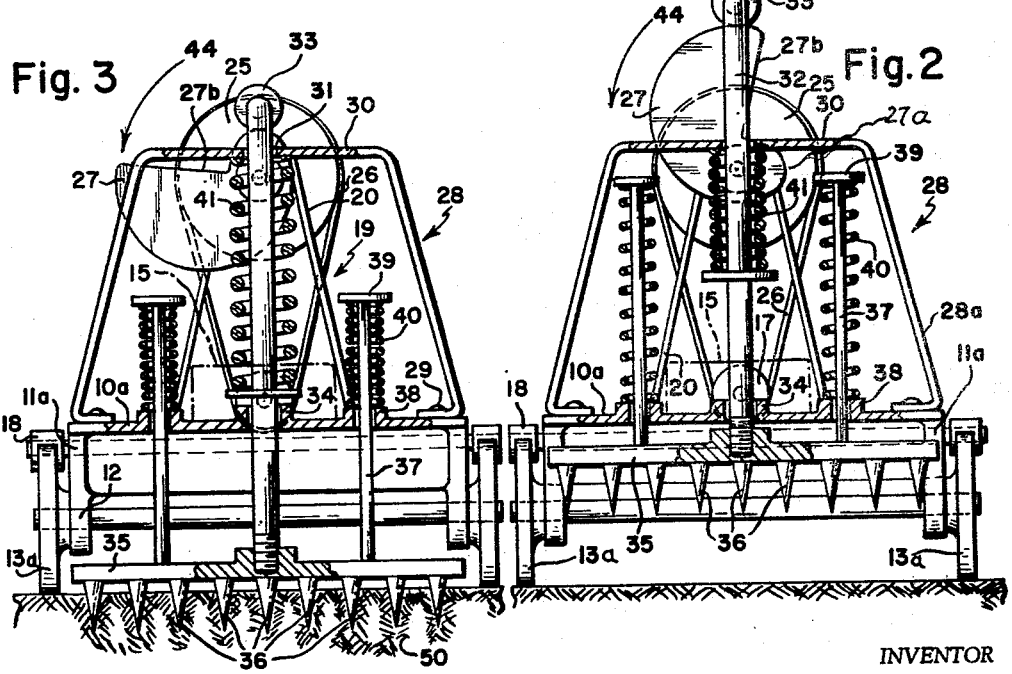
INVENTOR
JOHN C. RAY
BY    *Louis Chayka*
ATTORNEY 3,163,236
SOIL SPIKING MACHINE
John C. Ray, 1302 Lafayette Bldg., Detroit, Mich.
Filed Oct. 30, 1962, Ser. No. 234,104
2 Claims. (Cl. 172—21)

The object of the invention is to provide a machine capable of perforating top soil in order to aerate the same. The machine is designed for use on lawns, the specific object of the invention being to provide a compact mechanism of low weight, one to be operated by power means and capable of perforating the soil or more specifically the sod, by means of spikes mounted on a horizontal bar which is adapted to be reciprocated vertically. The operative elements of the machine are mounted on a platform supported by traction wheels, the whole machine being preferably self-propelled for movement upon a lawn.

A further object of the invention is to provide a machine of simple structure, one which calls for a minimum of operative elements but which will be fully practical and useful for the purpose for which it has been designed. The machine discloses certain novel features and a novel combination of parts as will be described herein with reference to the accompanying drawings in which:

FIG. 1 is a side elevational view of my sod spiking machine;

FIG. 2 is a front elevational view of the machine as taken from line 2—2 in FIG. 1, the view showing the machine in one phase of its operative position;

FIG. 3 is a front view of the machine in another phase of its operative position;

FIG. 4 is a view of one element in the structure of the machine as taken from line 4—4 in FIG. 1, the element being shown in a reduced size.

Similar numerals refer to similar parts throughout the several views.

The machine includes a carriage consisting of a platform 10 which on each side is provided with an integrally formed and downwardly turned flange 11. Each flange is provided with a bearing 12 for support of a traction wheel 13 which is equipped with a rubber tire 13a.

Mounted on the platform is a motor 14 with an adjoining gear box 15 which is part thereof. Projecting from said gear box and actuated by said motor is a forwardly extending shaft 16 which at its outer end carries a pulley 17, the latter being secured to the shaft for rotation therewith. Extending also from said gear box, on each side thereof, is a shaft carrying a roller 18 which is keyed to the shaft and which is in a frictional contact with the tire of the respective wheel 13.

Based upon the platform is a standard generally identified by numeral 19. It consists of two legs 20 secured to the platform by bolts 22, the two legs converging towards each other and being joined at the top by an integrally formed horizontal member 20a. Confined between the upper ends of the legs 20 and said horizontal member 20a is a bearing 21 to which I shall refer again.

The front end of the platform 10 is raised to form a ledge 10a and mounted thereon is another two legged standard generally indicated by numeral 23. At the top the standard carries another bearing 21 of the same type and size as that which is supported by the standard 19, the two bearings being horizontally alined. The bearings support a shaft which rearwardly of said standard 19, is fitted out with a pulley 25 axially keyed to said shaft, marked 24, for rotation therewith. A belt 26 connects said pulley 25 with the pulley 17 and serves to rotate the shaft about its axis. Mounted on the same shaft forwardly of the standard 23 is cam 27. The periphery of the cam is in part defined by a radial face 27b extending from the point most remote from the hub 27a of said cam to said hub.

Mounted on the ledge 10a, forwardly of the cam, is a stand in the shape of an inverted and broad letter U, the stand being identified by numeral 28. The side members 28a are secured to the ledge by bolts 29, said side members or legs being connected at the top by an integrally formed horizontal member 30. The midportion of said top member is provided with an aperture 31. Slideably fitting into said aperture is a vertical rod 32 which at the top is bent at right angle in the direction of the cam and across the rim of said cam, and serves as a means of axial support for a roller 33. The latter is disposed over said rim transversely, that is at right angle to the plane of rotation of the cam and is in a frictional contact with the cam.

The rod extends downwardly through a bearing 34 on said ledge marked 10a and serves to support a spike bar 35 which is located below said ledge. The bar is preferably of thick metal construction and carries on its underside a plurality of downwardly pointed spikes 36. At a point above the ledge but spaced therefrom, the rod is provided with a disk 32a, and coiled about the rod 32 between the washer and the top member 30 of the stand is a spring 41, the disk serving to support the spring from below.

Secured to the top of the spike bar 35 on each side of the rod 32, is a slender vertical member 37 which extends upwardly through a bearing 38 in the ledge 10a and is provided at the top with a cap 39. Coiled about each said member is a spring 40 of materially lower resistance to compression than the above named spring 41.

To provide guiding means for the machine, it is equipped with a U-shaped handle, the free ends of which are secured to brackets 43 at the rear portion of the platform 10.

The machine operates as follows:

Driven by the motor 14 by means of the pulleys 17 and 25 and the belt 26, the shaft 24 rotates the cam 26 which is keyed to said shaft. In the course of the rotation of the cam in the direction of the arrow 44, the rod 32 which through the roller 33 is in engagement with the rim of the cam, is gradually raised from the position shown in FIG. 3 to the position shown in FIG. 1 and in FIG. 2. The rise of the rod results in the compression of the spring 41 which is coiled about said rod. As the rotation of the cam continues, the rim portion of the cam at the extreme radial distance of the rim from the hub of the cam, moves from under the roller. As a consequence thereof, the rod 32 actuated by the recoil force of the pent up spring 41, is suddenly thrust downwardly, slamming the spike bar against the ground below to drive the spikes through the top portion thereof.

The spike bar in its downward movement carries with it the two rod-like members 37 which results in the compression of the two springs 40. While the combined tension of the two springs 40 is lower than that of the spring 41, they have sufficient strength to react immediately on the completion of the downward thrust of the rod 32 and the spike bar carried thereby to lift said spike bar out of engagement with said ground. As the above return movement of the bar is instantaneous, the thrust of the spikes into the ground does not interfere with the forward movement of the machine as a whole.

It will be understood that in the course of the downward movement of the rod 32, the roller 33 will drop into contact with the hub 27a as shown in FIG. 3. From this stage on, the operation of the mechanism will be repeated as described above.

It is obvious that some changes may be made in the structure of the machine and that individual elements of the combination of parts described herein may be varied in form or substituted by equivalent devices without departing from the inventive concept disclosed herein. What I therefore wish to claim is as follows:

1. In a soil spiking machine in combination:
   (a) a horizontal platform supported by ground wheels,
   (b) a horizontal shaft mounted for rotation upon the platform above the level thereof,
   (c) a cam axially secured to said shaft for rotation therewith, a part of the periphery of the cam being defined by an approximately radial line extending from a point at its extreme radius to the hub of said cam,
   (d) a vertically disposed rod adjoining said cam and including an extension at the top thereof disposed at right angles to the plane of rotation of said cam, said extension having a roller thereon for engagement from above with the edge face of said cam,
   (e) a stationary standard on the platform extending upwardly therefrom including a horizontal cross member having an aperture therein,
   (f) a bearing within said platform in vertical alignment with said aperture to permit movement of said rod through said aperture and through said bearing,
   (g) a horizontal member secured to the lower end of said rod, said member being equipped with a plurality of soil spikes extending downwardly therefrom,
   (h) primary coil spring means surrounding said rod and having one end thereof bearing against said cross member,
   (i) spring compression means fixedly mounted on said rod in contact with the other end of said spring means and adapted to compress said spring means in response to upward movement of said rod, said primary spring means serving to thrust the rack downwardly when the radial line of the cam passes under said roller to force said spikes into the soil,
   (j) secondary spring means supported on said platform,
   (k) secondary spring compression means extending upwardly from the horizontal elongated member and adapted to compress the secondary spring means upon downward movement of said rod, said secondary spring means being of sufficient size and resilience to impart, on recoil, sufficient upward movement of said rod to disengage said spikes from the soil, and
   (l) means to drive the cam to rotate the same about the axis of said shaft.

2. A soil spiking machine as set forth in claim 1, wherein said means to drive the cam comprises a motor mounted upon said platform.

References Cited in the file of this patent

UNITED STATES PATENTS

| | | |
|---|---|---|
| 483,567 | Marshall et al. | Oct. 4, 1892 |
| 1,853,079 | Plant | Apr. 12, 1932 |
| 2,043,076 | Smith | June 2, 1936 |
| 2,120,876 | Pullen | June 14, 1938 |
| 2,509,691 | McLemore | May 30, 1950 |
| 2,838,986 | Fessel | June 17, 1958 |

FOREIGN PATENTS

| | | |
|---|---|---|
| 334,104 | France | July 24, 1903 |
| 10,934 | Great Britain | Nov. 11, 1845 |
| 435,406 | Great Britain | Sept. 23, 1935 |